US008431845B2

(12) United States Patent
Pollitt et al.

(10) Patent No.: US 8,431,845 B2
(45) Date of Patent: Apr. 30, 2013

(54) ELECTRICAL SWITCHING APPARATUS AND LEVERING ASSEMBLY THEREFOR

(75) Inventors: William C. Pollitt, Murrysville, PA (US); Lance Gula, Clinton, PA (US); Nathan J. Weister, Darlington, PA (US); Craig A. Rodgers, Imperial, PA (US); Edward A. Prince, Aliquippa, PA (US)

(73) Assignee: Eaton Corporation, Cleveland, OH (US)

( * ) Notice: Subject to any disclaimer, the term of this patent is extended or adjusted under 35 U.S.C. 154(b) by 292 days.

(21) Appl. No.: 12/886,038

(22) Filed: Sep. 20, 2010

(65) Prior Publication Data

US 2012/0067707 A1    Mar. 22, 2012

(51) Int. Cl.
*H01H 9/20* (2006.01)
*H01H 33/42* (2006.01)

(52) U.S. Cl.
USPC ........................................................ 200/50.24

(58) Field of Classification Search ............... 200/50.24, 200/50.21–50.23, 50.25–50.27; 361/605–617
See application file for complete search history.

(56) References Cited

U.S. PATENT DOCUMENTS

| | | | |
|---|---|---|---|
| 3,947,728 A | 3/1976 | Smith | |
| 4,017,698 A | 4/1977 | Kuhn et al. | |
| 4,761,521 A | 8/1988 | Beck et al. | |
| 5,453,587 A | 9/1995 | Hurley et al. | |
| 5,477,017 A | 12/1995 | Swindler et al. | |
| 5,822,165 A | 10/1998 | Moran | |
| 6,504,693 B1 | 1/2003 | Moffat et al. | |
| 6,777,627 B1 | 8/2004 | Stevenson | |
| 6,897,388 B2 | 5/2005 | Greer | |
| 6,951,990 B1 * | 10/2005 | Miller | 200/50.24 |
| 7,019,229 B1 | 3/2006 | Weister et al. | |
| 7,019,230 B1 | 3/2006 | Vaill et al. | |
| 7,485,817 B2 | 2/2009 | Gottschalk | |
| 7,486,499 B2 | 2/2009 | Rambo et al. | |
| 8,164,875 B1 * | 4/2012 | Ledbetter et al. | 361/79 |
| 2009/0014291 A1 | 1/2009 | Stevenson | |
| 2009/0301851 A1 | 12/2009 | Morris et al. | |

FOREIGN PATENT DOCUMENTS

CN        101626148 A       1/2010

OTHER PUBLICATIONS

European Patent Office, extended European search report Appln. No. 11007652.8-1808, Jan. 3, 2013, 6pp.
English Abstract of CN 101626148A.

* cited by examiner

*Primary Examiner* — Felix O Figueroa
(74) *Attorney, Agent, or Firm* — Eckert Seamans Cherin & Mellott, LLC; Grant E. Coffield

(57) ABSTRACT

A levering assembly for an electrical switching apparatus, such as a circuit breaker, which is removably disposed in a cassette, includes a mounting member coupled to the housing of the circuit breaker. A drive assembly is coupled to the mounting member and cooperates with the cassette. A powered actuator, such as an electric motor, is disposed on the mounting member and actuates the drive assembly to move the circuit breaker with respect to the cassette. The powered actuator is disposed within the housing of the circuit breaker. The mounting member, drive assembly and powered actuator form a self-contained sub-assembly, which is substantially disposed behind the circuit breaker cover. The levering assembly is operable from a remote location to automatically move the circuit breaker with respect to the cassette, to provide enhanced safety among other benefits.

14 Claims, 4 Drawing Sheets

ELECTRICAL SWITCHING APPARATUS AND LEVERING ASSEMBLY THEREFOR

BACKGROUND

1. Field

The disclosed concept relates generally to electrical switching apparatus and, more particularly, to electrical switching apparatus, such as circuit breakers. The disclosed concept also relates to levering assemblies for circuit breakers.

2. Background Information

Electrical switching apparatus used in power distribution systems are often mounted within a switchgear enclosure either individually or in combination with other switchgear (e.g., without limitation, circuit switching devices and circuit interrupters such as circuit breakers, contactors, motor starters, motor controllers and other load controllers).

Some electrical switching apparatus such as, for example, some medium-voltage and low-voltage circuit breakers, can be relatively large. In order to facilitate movement (e.g., installation; removal; maintenance), some circuit breakers are commonly coupled to draw-out mechanisms which permit such circuit breakers to be drawn out of the switchgear enclosure. Accordingly, such circuit breakers are commonly known in the art as "draw-out" circuit breakers. The circuit breaker may be further supported within a draw-out frame, commonly known in the art as a cassette or chassis. The switchgear enclosure generally includes a number of cells, with each cell being structured to receive a corresponding circuit breaker. The draw-out mechanism includes, for example, a combination of rails and rollers coupled to one or the other, or both, of the sidewalls of the cell and the sides of the corresponding circuit breaker and/or cassette, which is to be drawn into and out of the cell. A levering in assembly (sometimes referred to as a "lev-in" device), which among other components includes a drive screw and drive rack, facilitates levering the circuit breaker into the cassette. Draw-out circuit breakers are described in further detail, for example, in commonly assigned U.S. Pat. No. 7,019,229, which is hereby incorporated herein by reference.

It is sometimes desirable to provide automated (e.g., without limitation, motorized or powered) operation of the lev-in device, for example, to avoid manual operation and/or to enable remote operation from a distal location to enhance safety. Prior proposals for meeting these objectives involve relatively complex and cumbersome separate, external power systems or gear (e.g., without limitation, wiring harnesses; truck or cart assemblies; adapters) structured to interface with the lev-in device from the exterior of the circuit breaker, for example, through an access opening in the circuit breaker cover or door.

There is, therefore, room for improvement in electrical switching apparatus, such as circuit breakers, and in levering assemblies therefor.

SUMMARY

These needs and others are met by embodiments of the disclosed concept, which are directed to a levering assembly for an electrical switching apparatus, such as a circuit breaker. Among other benefits, the levering assembly includes an internal powered actuator.

As one aspect of the disclosed concept, a levering assembly is provided for an electrical switching apparatus. The electrical switching apparatus is structured to be removably disposed in a cassette, and includes a housing. The levering assembly comprises: a mounting member structured to be coupled to the housing; a drive assembly coupled to the mounting member and being structured to cooperate with the cassette; and a powered actuator disposed on the mounting member and being structured to actuate the drive assembly to move the electrical switching apparatus with respect to the cassette.

The powered actuator may be structured to be disposed within the housing of the electrical switching apparatus, and may be operable from a remote location. The powered actuator may be an electric motor, and the drive assembly may include a drive rack. The electric motor may include a pinion, wherein the pinion moves the drive rack. The mounting member, the drive assembly and the powered actuator may form a self-contained sub-assembly, and the housing of the electrical switching apparatus may include a cover, wherein the self-contained sub-assembly is structured to be substantially disposed behind the cover. The self-contained sub-assembly may be operable to automatically move the electrical switching apparatus with respect to the cassette, without any separate actuators external to the electrical switching apparatus.

An electrical switching apparatus, which employs the aforementioned levering assembly is also disclosed.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the statement that two or more parts are "coupled" together shall mean that the parts are joined together either directly or joined through one or more intermediate parts.

As employed herein, the term "number" shall mean one or an integer greater than one (i.e., a plurality).

Figure 1:
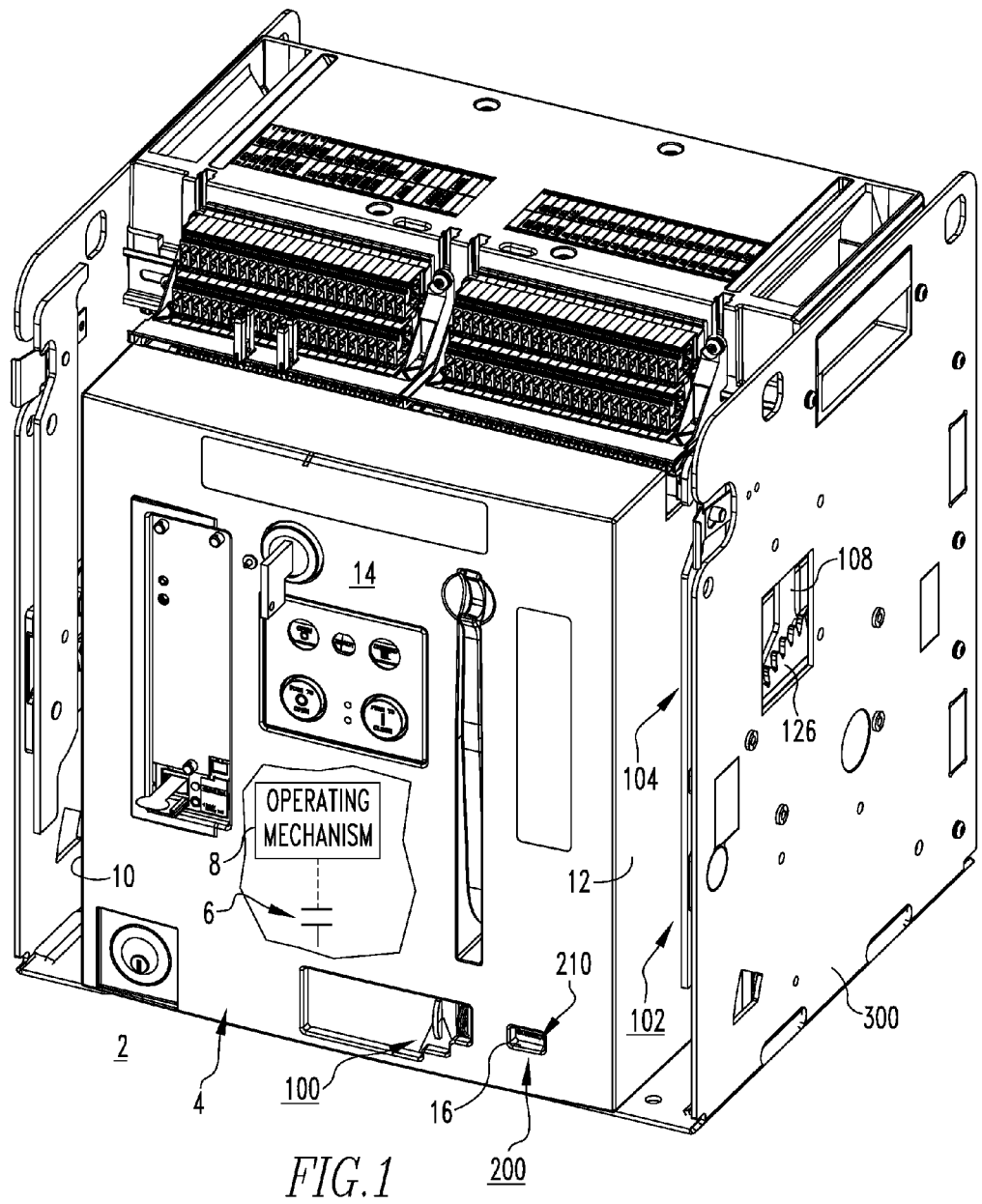
FIG. 1 is an isometric view of a circuit breaker and levering assembly therefor, in accordance with an embodiment of the disclosed concept.
Figure 2:
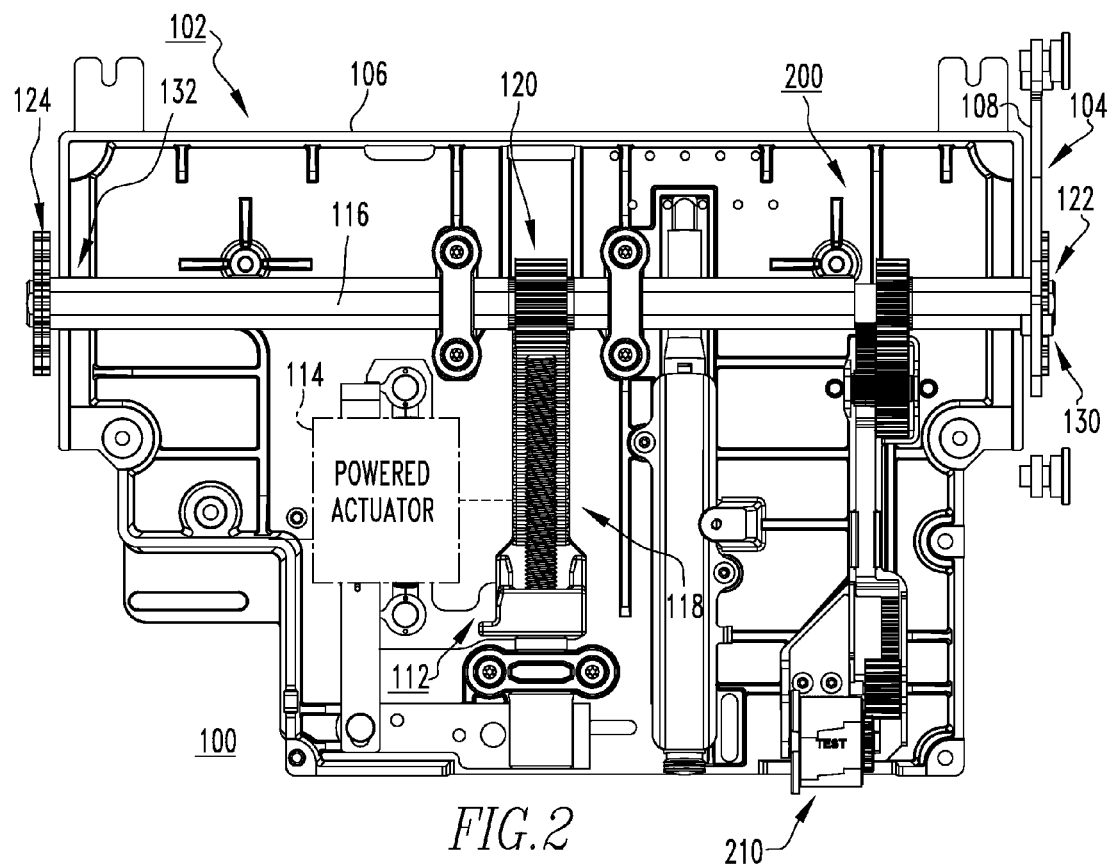
FIG. 2 is a top plan view of the levering assembly of FIG. 1, shown in the "connect" configuration with a powered actuator shown in simplified form.

FIG. 1 shows a non-limiting example of an electrical switching apparatus, such as a circuit breaker 2, employing a levering assembly 100 (best shown in FIGS. 2-5), in accordance with the disclosed concept. The circuit breaker 2 includes a housing 4, separable contacts 6 (shown in simplified form) enclosed by the housing 4, and an operating mechanism 8 (shown in simplified form) for opening and closing the separable contacts 6. In the example of FIG. 1, the circuit breaker housing 4 includes first and second opposing sides 10,12 and a cover 14 having a window 16 through which an indicator 210 of an indicator assembly 200 can be seen, in order to readily determine the configuration (e.g., position) of the circuit breaker 2 with respect to the cassette 300. That is, the levering assembly 100 enables the circuit breaker 2 to be racked or levered into and out of the cassette 300 such that it is movable among a plurality of positions. For example and without limitation, the indicator 210 of the position indicator assembly 200 shown and described herein is in the form of "connect", "disconnect" and "test" labels corresponding to the positions of the circuit breaker 2 with respect to the cassette 300, shown in FIGS. 1-3, 4 and 5, respectively.

Figure 3:
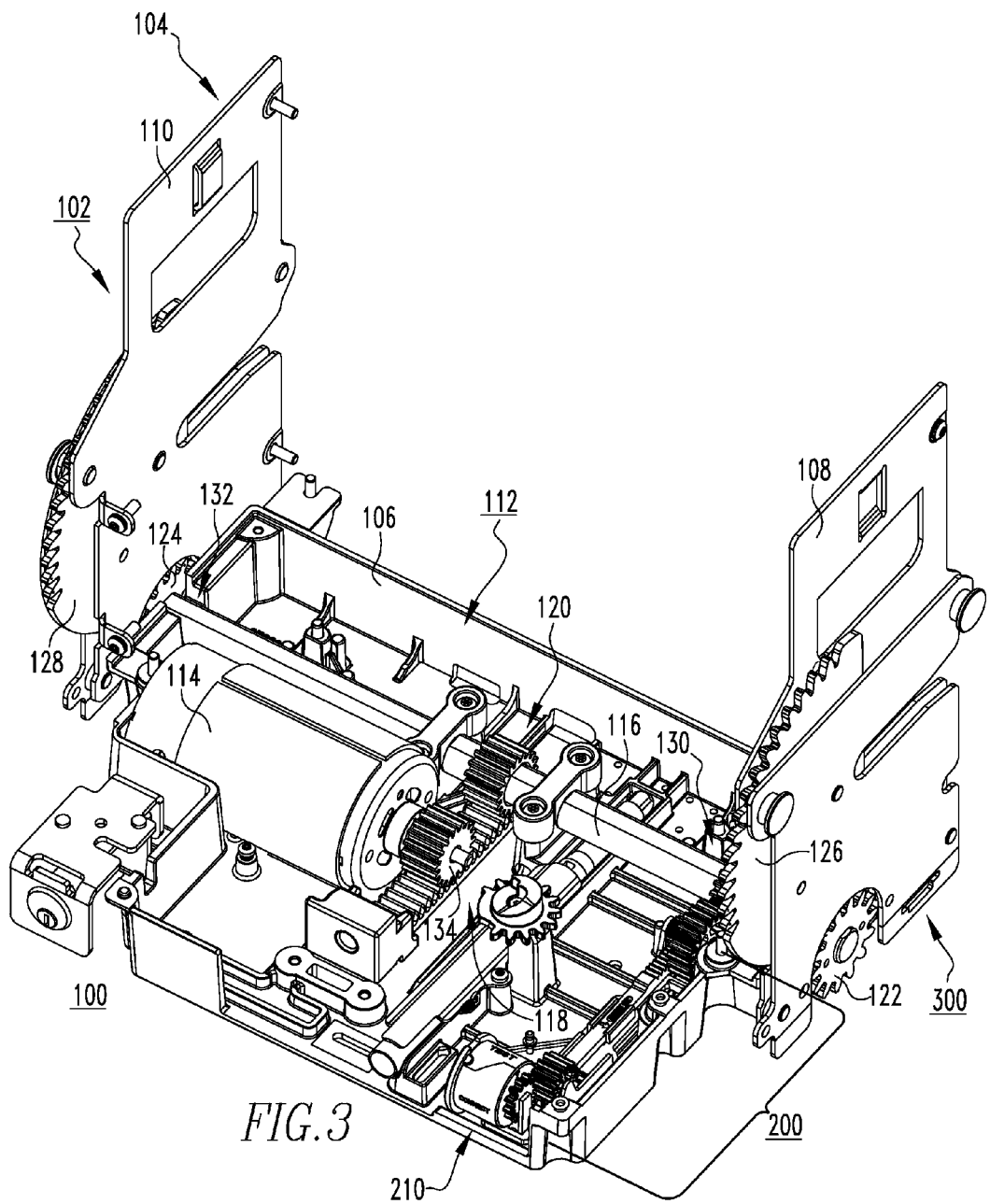
FIG. 3 is an isometric view of the levering assembly and an electric motor therefor, in accordance with an embodiment of the disclosed concept.
Figure 4:
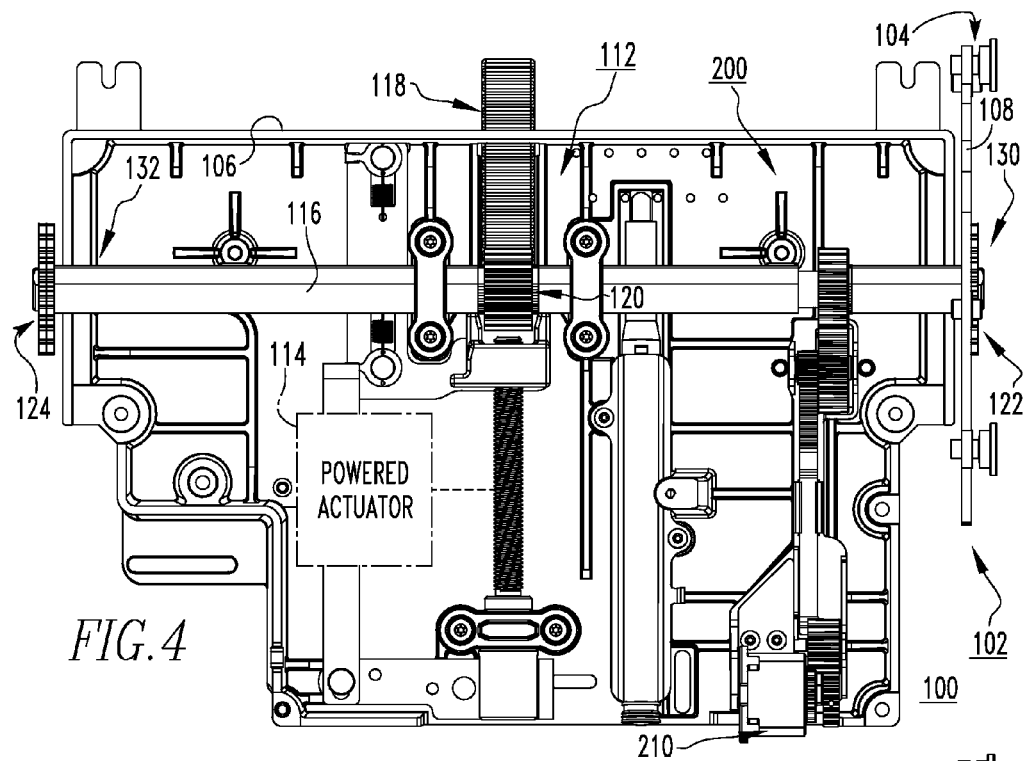
FIG. 4 is a top plan view of the levering assembly, shown in the "disconnect" configuration with the powered actuator shown in simplified form.
Figure 5:
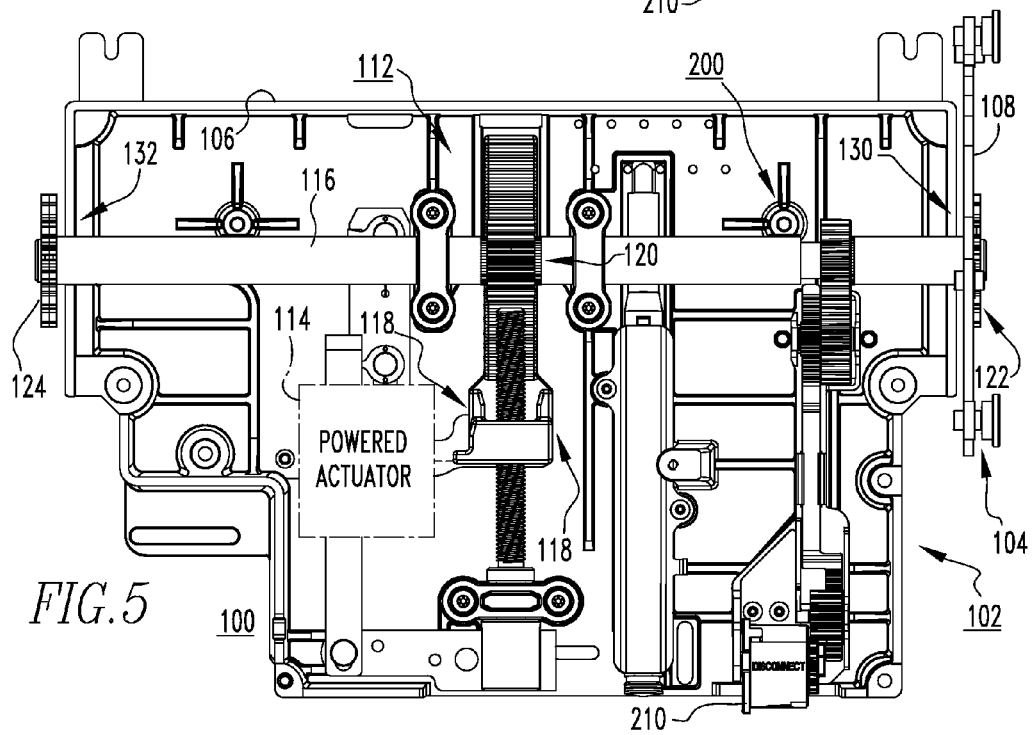
FIG. 5 is a top plan view of the levering assembly of FIG. 4, shown in the "test" configuration.

As shown in FIGS. 2-5, the levering assembly 100 preferably includes a mounting member 102, which is suitably coupled to the circuit breaker housing 4 (FIG. 1). A drive assembly 112 is coupled to the mounting member 106 and cooperates with the cassette 300 (FIG. 1; also partially shown in FIG. 3). A powered actuator 114 (see FIG. 3; also shown in simplified form in phantom line drawing in FIGS. 2, 4 and 5) is disposed on the mounting member 102, and is structured to actuate the drive assembly 112 to move the circuit breaker 2 (FIG. 1) with respect to the cassette 300 (FIGS. 1 and 3). That is, the powered actuator 114 is preferably disposed within the circuit breaker housing 4. Thus, among other benefits, the disclosed levering assembly 100 provides a mechanism for effectively racking or levering the circuit breaker 2 (FIG. 1) into an out of the cassette 300 (FIGS. 1 and 3), or to any desired position with respect to the cassette 300 (FIGS. 1 and 3), without requiring any other separate external gear (e.g., without limitation, external actuators; external motor; external wiring harnesses; external truck or cart assemblies; external couplings or tools) to facilitate movement of the circuit breaker 2 (FIG. 1).

Accordingly, the powered actuator 114 is operable from a remote location, thereby improving safety. More specifically, enhanced arc flash protection is afforded because the operator is not required to manually remove the circuit breaker 2 (FIG. 1). For example and without limitation, the disclosed levering assembly 100 and, in particular, the powered actuator 114 therefor, could be actuated with an external command from a control center (not shown) (e.g., without limitation, by pushing a button (not shown) at a remote location a safe distance from the circuit breaker 2 (FIG. 1)). Thus, it will be appreciated that the mounting member 102, drive assembly 112, and powered actuator 114 form a self-contained sub-assembly (e.g., levering assembly 100), which is structured to be substantially disposed behind the cover 14 (FIG. 1) of the circuit breaker 2 (FIG. 1). The self-contained sub-assembly 100 is operable to automatically move the circuit breaker 2 (FIG. 1) with respect to the cassette 300 (FIG. 1), without requiring any separate actuators or gear external to the circuit breaker 2. In other words, because the powered actuator 114 is internal to the circuit breaker 2 itself, there is no requirement, for example, for external wire harnessing, switches or other devices or gear to translate positional information. This greatly simplifies the complexity of the levering assembly 100 while simultaneously enhancing safety.

As shown in FIG. 3, the drive assembly 112 of the example levering assembly 100 preferably includes a drive shaft 116, a plurality of gears 118,120,122,124, and a number of racking members 126,128. The racking members 126,128 are movably coupled to the cassette 300. The powered actuator 114, which in the non-limiting example of FIG. 3 is an electrical motor 114, is operable to move the gears 118,120,122,124 and the drive shaft 116, thereby moving the racking members 126,128 to rack the circuit breaker 2 (FIG. 1) into or out of the cassette 300 (FIG. 1). The mounting member 102 of the example levering assembly 100 includes a frame 104 and a mount 106, wherein the mount 106 extends between opposing first and second sides 108,110 of the frame 104, as shown.

The drive shaft 116 is pivotably coupled to the mount 106, and the electric motor 114 is disposed on the mount 116 proximate to the drive shaft 116.

In the example of FIG. 3, the gears of the drive assembly 112 include a drive rack 118, a drive gear 120 and first and second racking gears 122,124. More specifically, the drive shaft 116 includes first and second opposing ends 130,132. The first racking gear 122 is coupled to the drive shaft 116 at or about the first end 130, and the second racking gear 124 is coupled to the drive shaft 116 at or about the second end 132. The drive gear 120 is also coupled to the drive shaft 116, between the first and second ends 130,132. Accordingly, it will be appreciated that, in operation, the first racking gear 122 engages and moves the first racking member 126, and the second racking gear 124 engages and moves the second racking member 128.

The electric motor 114 includes a pinion 134. When the electric motor 114 is actuated, the pinion 134 pivots, thereby moving the drive rack 118. The drive rack 118 then moves the drive gear 120, thereby pivoting the drive shaft 116 and the first and second racking gears 122,124 coupled to the first and second ends 130,132, respectively, thereof. This, in turn, moves the racking members 126,128, which are movably coupled to the sides of the cassette 300 (FIG. 1). Consequently, movement of the circuit breaker 2 (FIG. 1) with respect to the cassette 300 (FIG. 1) by way of the levering assembly 100 is initiated by the powered actuator 114 (e.g., without limitation, electric motor) within the circuit breaker 2 (FIG. 1), and is controlled to rack or lever the circuit breaker 2 (FIG. 1) into or out of any desired position with respect to the cassette 300 (FIG. 1). It will be appreciated that any known or suitable alternative type and/or configuration of powered actuator (not shown) other than the electric motor 114 and pinion 134 could be employed to initiate movement of the circuit breaker 2 (FIG. 1) from within the circuit breaker 2 (FIG. 1), without departing from the disclosed concept.

In view of the foregoing, the disclosed levering assembly 100 provides an effective and efficient mechanism for safely, automatically moving a circuit breaker or other suitable electrical switching apparatus 2 (FIG. 1) with respect to a cassette 300 (FIG. 1), without requiring the use of any external actuators, gear or other devices. Thus, among other benefits, the disclosed levering assembly 100, with its internal powered actuator 114, provides automated control and permits the levering assembly 100 to be used to provide arc flash protection, thereby improving safety with respect to the operation of the circuit breaker 2 (FIG. 1).

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A levering assembly for an electrical switching apparatus structured to be removably disposed in a cassette, said electrical switching apparatus including a housing, said levering assembly comprising:
    a mounting member structured to be coupled to the housing;
    a drive assembly coupled to said mounting member and being structured to cooperate with said cassette; and a powered actuator disposed on said mounting member and being structured to actuate said drive assembly to move said electrical switching apparatus with respect to said cassette, wherein said drive assembly comprises a drive shaft, a plurality of gears, and a number of racking members; wherein said racking members are structured to be movably coupled to said cassette; and wherein said powered actuator is structured to move said gears and said drive shaft, thereby moving said racking members to rack said electrical switching apparatus into or out of said cassette, wherein said mounting member comprises a frame and a mount; wherein said frame includes a first side and a second side disposed opposite and distal from the first side; wherein said mount extends between the first side and the second side; wherein said drive shaft is pivotably coupled to said mount; and wherein said powered actuator is disposed on said mount proximate to said drive shaft, wherein said plurality of gears comprises a drive rack, a drive gear, and a number of racking gears; wherein said drive gear and said racking gears are coupled to said drive shaft; wherein each of said racking gears is structured to cooperate with a corresponding one of said racking members; and wherein said powered actuator is structured to move said drive rack, thereby pivoting said drive gear, said drive shaft and said racking gears to move said racking members, and wherein said drive shaft includes a first end and a second end disposed opposite and distal from the first end; wherein said number of racking gears is a first racking gear coupled to said drive shaft at or about the first end, and a second racking gear coupled to said drive shaft at or about the second end; wherein said drive gear is coupled to said drive shaft between the first end and the second end; wherein said number of racking members is a first racking member and a second racking member disposed opposite and distal from said first racking member; wherein said first racking gear engages and moves said first racking member; and wherein said second racking gear engages and moves said second racking member.

2. The levering assembly of claim 1 wherein said powered actuator is structured to be disposed within the housing of said electrical switching apparatus.

3. The levering assembly of claim 1 wherein said powered actuator is operable from a remote location.

4. The levering assembly of claim 1 wherein said powered actuator is an electric motor; wherein said electric motor includes a pinion; and wherein said pinion moves said drive rack.

5. A levering assembly for an electrical switching apparatus structured to be removably disposed in a cassette, said electrical switching apparatus including a housing, said levering assembly comprising:

a mounting member structured to be coupled to the housing;

a drive assembly coupled to said mounting member and being structured to cooperate with said cassette; and a powered actuator disposed on said mounting member and being structured to actuate said drive assembly to move said electrical switching apparatus with respect to said cassette, wherein said mounting member, said drive assembly and said powered actuator form a self-contained sub-assembly; wherein the housing of said electrical switching apparatus includes a cover; and wherein said self-contained sub-assembly is structured to be substantially disposed behind said cover, and wherein said self-contained sub-assembly is operable to automatically move said electrical switching apparatus with respect to said cassette, without any separate actuators external to said electrical switching apparatus.

6. The levering assembly of claim 5 wherein said powered actuator is structured to be disposed within the housing of said electrical switching apparatus.

7. The levering assembly of claim 5 wherein said powered actuator is operable from a remote location.

8. An electrical switching apparatus comprising:

a housing; and a levering assembly structured to move said electrical switching apparatus into and out of a cassette, said levering assembly comprising:

a mounting member coupled to the housing, a drive assembly coupled to said mounting member and cooperating with said cassette, and a powered actuator disposed on said mounting member and actuating said drive assembly to move said electrical switching apparatus with respect to said cassette, wherein said drive assembly comprises a drive shaft, a plurality of gears, and a number of racking members; wherein said racking members are movably coupled to said cassette; and wherein said powered actuator moves said gears and said drive shaft, thereby moving said racking members to rack said electrical switching apparatus into or out of said cassette, wherein said mounting member of said levering assembly comprises a frame and a mount; wherein said frame includes a first side and a second side disposed opposite and distal from the first side; wherein said mount extends between the first side and the second side; wherein said drive shaft is pivotably coupled to said mount; and wherein said powered actuator is disposed on said mount proximate to said drive shaft, wherein said plurality of gears comprises a drive rack, a drive gear, and a number of racking gears; wherein said drive gear and said racking gears are coupled to said drive shaft; wherein each of said racking gears cooperates with a corresponding one of said racking members; and wherein said powered actuator moves said drive rack, thereby pivoting said drive gear, said drive shaft and said racking gears to move said racking members, and wherein said drive shaft includes a first end and a second end disposed opposite and distal from the first end; wherein said number of racking gears is a first racking gear coupled to said drive shaft at or about the first end, and a second racking gear coupled to said drive shaft at or about the second end; wherein said drive gear is coupled to said drive shaft between the first end and the second end; wherein said number of racking members is a first racking member and a second racking member disposed opposite and distal from said first racking member; wherein said first racking gear engages and moves said first racking member; and wherein said second racking gear engages and moves said second racking member.

9. The electrical switching apparatus of claim 8 wherein said powered actuator of said levering assembly is disposed within the housing of said electrical switching apparatus.

10. The electrical switching apparatus of claim 8 wherein said powered actuator is operable from a remote location.

11. The electrical switching apparatus of claim 8 wherein said powered actuator of said levering assembly is an electric motor; wherein said electric motor includes a pinion; and wherein said pinion moves said drive rack.

12. An electrical switching apparatus comprising:
 a housing; and
 a levering assembly structured to move said electrical switching apparatus into and out of a cassette, said levering assembly comprising:
  a mounting member coupled to the housing,
  a drive assembly coupled to said mounting member and cooperating with said cassette; and
  a powered actuator disposed on said mounting member and actuating said drive assembly to move said electrical switching apparatus with respect to said cassette,
  wherein said mounting member, said drive assembly and said powered actuator form a self-contained sub-assembly; wherein the housing of said electrical switching apparatus includes a cover; and wherein said self-contained sub-assembly is substantially disposed behind said cover, and
  wherein said electrical switching apparatus is a circuit breaker; and wherein said levering assembly is operable to automatically move said circuit breaker with respect to said cassette.

13. The electrical switching apparatus of claim 12 wherein said powered actuator of said levering assembly is disposed within the housing of said electrical switching apparatus.

14. The electrical switching apparatus of claim 12 wherein said powered actuator is operable from a remote location.

\* \* \* \* \*